May 12, 1959   C. B. SMALL   2,886,379
SELF-ALIGNING BEARING
Filed May 6, 1955
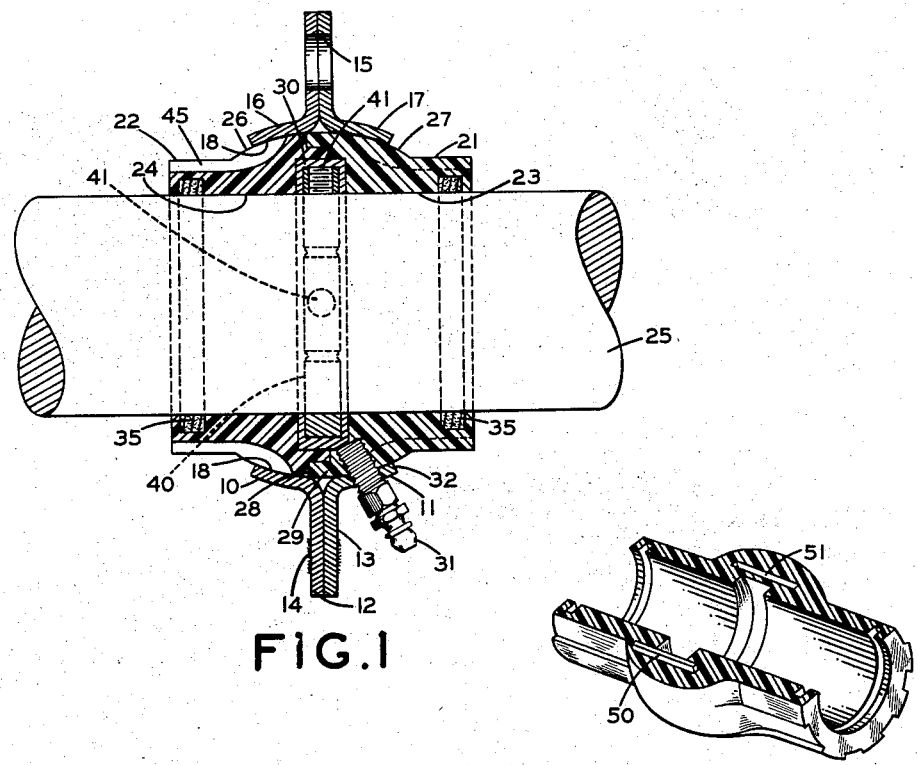
FIG.1
FIG.3
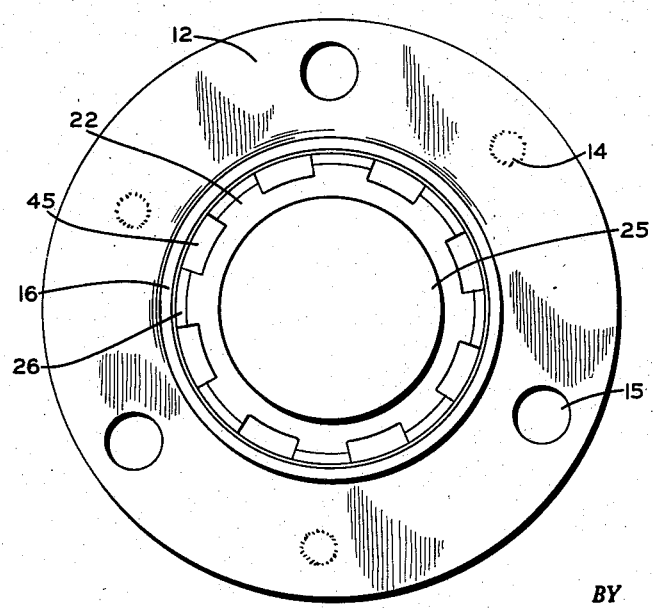
FIG.2
INVENTOR.
CHARLES B. SMALL
BY
*Eber J. Hyde*
ATTORNEY

United States Patent Office 2,886,379
Patented May 12, 1959

2,886,379

SELF-ALIGNING BEARING

Charles B. Small, Euclid, Ohio, assignor to Clevite Corporation, Cleveland, Ohio, a corporation of Ohio Application May 6, 1955, Serial No. 506,420

6 Claims. (Cl. 308—72)

This invention pertains to a self-aligning bearing, and more particularly to a self-aligning bearing for applications where the unit loading is relatively low and the relative rotation between the bearing parts is not high.

An object of the present invention is to provide an inexpensive, easily assembled, light-duty, self-aligning bearing which is easy to use.

For a better understanding of the present invention, together with other and further objects thereof, reference is had to the following description taken in connection with the accompanying drawings, and its scope will be pointed out in the appended claims.

Figure 1 is a sectional view of the self-aligning bearing of the invention mounted around a shaft.

Figure 2 is an end view of the bearing, and

Figure 3 is a sectional, isometric view of a modified form of the invention.

With reference to the drawing there is shown in Figure 1 a self-aligning bearing comprised of a first and a second annular bearing housing member identified by reference characters 10 and 11 respectively. Each of these two housing members has an outer flange portion 12, 13 secured together by a plurality of spot-welded locations 14, or by extruded material from one flange swaged into pierced holes in the other flange. Bolt holes 15 are provided through the flanges 12, 13 for securing the self-aligning bearing to a sheet metal member or to a holder to form a pillow block.

Each of the annular bearing housing members 10, 11 has an inner portion 16, 17 which extends outwardly away from the other flange member, and curved toward the axis of the unit. The two curved inner portions 16, 17 together form a truncated spherical section with a concave inner surface 18.

Held between the flange members 12 and 13 are two bearing members 21, 22 each of which has an internal bore 23, 24 to accommodate a shaft 25. The bearing members 21, 22 each have an outside convex surface 26, 27 for bearing engagement with the concave surface 18 of the annular housing member.

The two bearing members 21, 22 are held together by the interconnected annular housing members 12, 13 in abutting face-to-face relationship with their axial bores aligned. The abutting faces of the bearing members 21, 22 may have annular interlacing complementary grooved and projecting portions 28, 29 whereby the two bearing members axially nest with each other, and a groove 30 is provided radially inwardly from the engaging faces of the two bearing members 21, 22.

The groove 30 may be filled with an oil retaining material such as felt or the like, and an oil supply fitting 31 is connected through one of the bearing members 21 communicating with the groove 30 so that a new supply of oil or grease may be admitted to the groove 30. Since relative motion takes place between the two bearing members and the annular housing members 10, 11, the portion 17 of the housing member is cut away at 32 around the location of the fitting 31. The relative motion due to rotation of the shaft 25 takes place between the shaft and the bearing members 21, 22. Oil or grease supplied occasionally under pressure through the fitting 31 to the groove 30 tends to keep dirt and foreign matter out from between the shaft and the bearing members, and sealing rings 35 are provided in grooves at the outside edges of the bearing members 21, 22.

Preferably the bearing members 21, 22 are made of a plastic bearing material such as nylon, nylatron, Teflon or the like, which combine embeddability and conformability with low coefficient of friction, resistance to seizure, and which are sufficiently soft not to score an adjacent metal part.

It is not essential that the flanges 12, 13 be permanently connected together, as it is sometimes desirable that the halves of the housing come apart so that they can be reassembled over a collar 40 secured to the shaft 25 by one or more set screws 41. The collar 41 fits within the groove 30 and transmits lateral thrust from the shaft 25 to the self-aligning bearing member.

In order to keep the cost of the bearing unit as low as possible, scallops 45 may be molded into the plastic parts to reduce weight without materially reducing the strength of the unit.

As shown in Figure 1 the plastic internal portion of the bearing is formed in two sections 21, 22 which separate from each other along a plane generally transverse to the axis of the unit. It is not essential, however, that the separation of the inner bearing member take place transverse to the axis of the unit, as shown by Figure 3.

Figure 3 shows one of two similar bearing halves split substantially parallel to the axis of the device. Each half has a ridge 50 cast on one of its faces and a groove 51 cast in its opposite face. Thus, two such bearing halves may be held in place around a shaft by flange members 16, 17, with the ridge 50 of one bearing half locked into the groove 51 in the other bearing half.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A self-alingning bearing for a rotatable shaft comprising first and second annular bearing housing members having outer flange portions connected together in face-to-face relationship and each having an inner portion extending outwardly away from the other flange portion together forming a truncated spherical section with a concave inner surface, first and second annular bearing members formed of plastic bearing material each of which has an internal bore defined by bearing material to accommodate and engage said shaft substantially throughout the length of said bearing member and provide for a first bearing engagement therebetween and an outside convex bearing surface for bearing engagement with the concave surface of said annular bearing housing members to provide for relative motion due to misalignment, said two bearing members being held by said interconnected annular bearing housing members in abutting face-to-face relationship with their axial bores aligned.

2. A self-aligning bearing for a rotatable shaft as set forth in claim 1, further characterized by said truncated spherical section being formed of metal, and by said first and second bearing members together defining a central annular thrust groove, and a thrust collar connected to said shaft and positioned in said thrust groove.

3. A self-aligning bearing for a rotatable shaft as set forth in claim 2, further characterized by said first and second bearing members being formed of nylon.

4. A self-aligning bearing for a rotatable shaft as set forth in claim 2, further characterized by said first and second bearing members engaging each other in a plane parallel to the axis of said unit.

5. A self-aligning bearing as set forth in claim 4, further characterized by a plurality of portions of the outside face of said plastic bearing portions being scalloped to reduce the weight without materially reducing the strength thereof.

6. A self-aligning bearing as set forth in claim 4, further characterized by lubricating means extending through one of said bearing members from the outside thereof to said groove, said groove serving as a lubricant reservoir for said bearing.

References Cited in the file of this patent

UNITED STATES PATENTS

| | | |
|---|---|---|
| 159,909 | Dierker | Feb. 16, 1875 |
| 1,606,747 | Carter | Nov. 16, 1926 |
| 2,675,283 | Thomson | Apr. 13, 1954 |
| 2,702,730 | Ivanoff et al. | Feb. 22, 1955 |

FOREIGN PATENTS

| | | |
|---|---|---|
| 119,971 | Germany | Apr. 30, 1901 |
| 192,288 | Great Britain | Feb. 1, 1923 |
| 553,067 | Great Britain | May 6, 1943 |
| 122,320 | Australia | Oct. 3, 1946 |
| 23,327 | Finland | July 7, 1949 |